(12) United States Patent
Wang

(10) Patent No.: US 8,371,737 B2
(45) Date of Patent: Feb. 12, 2013

(54) FOLDABLE LIGHT SOURCE MODULE AND BACKLIGHT MODULE WITH THE LIGHT SOURCE MODULE

(75) Inventor: Ching-Hui Wang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 263 days.

(21) Appl. No.: 12/785,926

(22) Filed: May 24, 2010

(65) Prior Publication Data

US 2011/0080754 A1    Apr. 7, 2011

(30) Foreign Application Priority Data

Oct. 1, 2009 (TW) ............................... 98133453 A

(51) Int. Cl.
*F21V 7/04* (2006.01)
(52) U.S. Cl. ..................... 362/612; 362/613; 362/631
(58) Field of Classification Search .................. 362/612, 362/613, 630, 631, 634, 249, 2, 249.06
See application file for complete search history.

(56) References Cited

U.S. PATENT DOCUMENTS

| 7,553,060 | B2 * | 6/2009 | Tanabe | 362/612 |
|---|---|---|---|---|
| 7,556,415 | B2 * | 7/2009 | Hamada et al. | 362/612 |
| 7,802,911 | B2 * | 9/2010 | Tanabe | 362/612 |
| 2004/0212982 | A1 | 10/2004 | Chang | |
| 2007/0253218 | A1 * | 11/2007 | Tanabe | 362/612 |
| 2012/0087150 | A1 | 4/2012 | Hamada et al. | |

FOREIGN PATENT DOCUMENTS

| TW | 200420854 A | 10/2004 |
|---|---|---|
| TW | 200817770 A | 4/2008 |
| TW | M350030 | 2/2009 |

OTHER PUBLICATIONS

English language translation of abstract of TW 2005115295.
English language translation of abstract of TW M350030 (published Feb. 1, 2009).
Taiwan Office Action dated Nov. 30, 2012.

* cited by examiner

*Primary Examiner* — Thomas Sember
(74) *Attorney, Agent, or Firm* — McClure, Qualey & Rodack, LLP

(57) ABSTRACT

A foldable light source module and a backlight module with the light source module are provided. The light source module includes a first substrate, first light sources, a second substrate, and second light sources. The first substrate has a first surface and a first connecting portion. The first light sources are arranged in a line and disposed on the first surface. A first gap is kept between the neighboring first light sources. The second substrate which has a second surface and a second connecting portion is disposed parallel to the first substrate, wherein the second surface faces the first surface, and the second connecting portion connects to the first connecting portion. The second light sources are arranged in a line and disposed on the second surface. A second gap is kept between the neighboring second light sources. At least a portion of the second light source extends into the corresponding first gap and, conversely, at least a portion of the first light source extends into the corresponding second gap.

23 Claims, 6 Drawing Sheets

FOLDABLE LIGHT SOURCE MODULE AND BACKLIGHT MODULE WITH THE LIGHT SOURCE MODULE

This application claims priority based on a Taiwanese Patent Application No. 098133453, filed on Oct. 1, 2009, the disclosure of which is incorporated herein by reference in its entirety.

BACKGROUND OF THE INVENTION

1. Field of the Invention

The present invention relates to a light source module and a backlight module with the light source module; particularly, the present invention relates to the structure of a light source module and a backlight module with the light source module.

2. Description of the Related Art

Since the liquid crystal of liquid crystal display (LCD) can not emit light itself, a backlight module is often employed as the light source. At present, the most common light sources are made of light emitting diode (LED) and cold cathode fluorescent lamp (CCFL). The selection of light source depends on various factors such as the size of display panel, the brightness requirements, the demand of power saving, etc.

FIG. 1 is a schematic view of a conventional light source module. As shown in FIG. 1, the conventional light source module is formed as a light bar which has numerous LEDs 1 disposed in a line on a long-strip substrate. The light bar is disposed in a backlight module to serve as the light source of LCD. Pads 3 are disposed on the substrate 2. When disposing the LEDs 1, two ends of the LED 1 are respectively soldered on different pads 3, so that the LEDs 1 can be fixed on the substrate 2. Because all LEDs 1 are disposed on a same plane on one hand, a gap must be kept between different pads 3 to avoid the short circuit between the solders, and on the other hand, the size of the pads 3 must be sufficient to allow the solders to firmly adhere the LEDs 1 on the substrate 2. However, in order to achieve the two objectives mentioned above, a minimum distance between the LEDs on a substrate has to be kept. In other words, according to the conventional disposing manner, the amount of LEDs on a substrate will be restricted.

Hence, for the higher brightness requirement of LCDs which employ conventional LED disposing manner, especially when the volume is restricted, it is difficult to meet the brightness requirement by increasing the amount of LED.

SUMMARY OF THE INVENTION

It is an objective of the present invention to provide a foldable light source module and a backlight module with the light source module, so as to increase the density of the light emitting elements in the light source module. As such, the brightness of flat panel display can be enhanced to improve the above-mentioned problems of prior art. Moreover, since the distance between light emitting elements are shortened, the required light mixing distance between the light source module and the optical film is correspondingly shortened.

The light source module of the present invention includes a first substrate, first light sources, a second substrate, and second light sources. The first substrate has a first surface and a first connecting portion. The first light sources are arranged in a line and disposed on the first surface. A first gap is kept between the neighboring first light sources. The second substrate which has a second surface and a second connecting portion is disposed parallel to the first substrate, wherein the second surface faces the first surface, and the second connecting portion connects to the first connecting portion. The second light sources are arranged in a line and disposed on the second surface. A second gap is kept between the neighboring second light sources. At least a portion of the second light source extends into the corresponding first gap and, correspondingly, at least a portion of the first light source extends into the corresponding second gap.

The light source module of the present invention increases the density of light sources by interlacing two sets of light sources of opposite extending directions, so that more light sources can be disposed to meet severe brightness requirement while the length of effective display region of a flat panel display is fixed.

DETAILED DESCRIPTION OF THE PREFERRED EMBODIMENT

The present invention provides a foldable light source module and a backlight module with the light source module. In a preferred embodiment, the foldable light source module and the backlight module are applied to various flat panel displays. However, in other embodiments, the foldable light source module and the backlight module can be applied to other devices in need of light sources.

Figure 1:
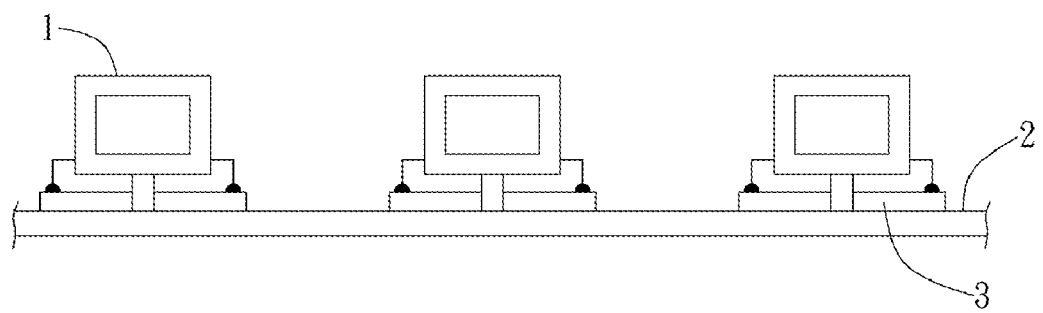
FIG. 1 is a schematic view of a conventional light source module.
Figure 2A:
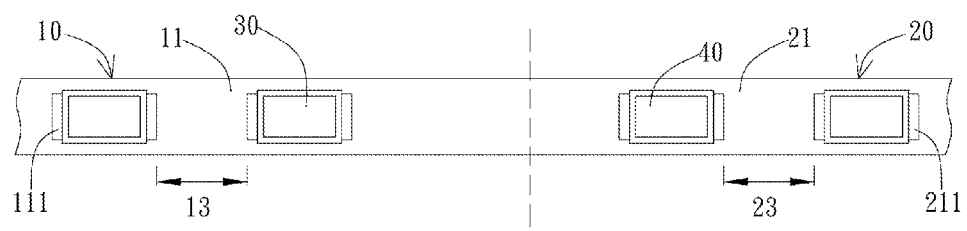
FIG. 2A is a schematic view of a first embodiment of a light source module of the present invention before folded.

FIG. 2A is a schematic view of a first embodiment of a light source module of the present invention before folded. As shown in FIG. 2A, the light source module includes a first substrate 10, a second substrate 20, first light sources 30, and second light sources 40. In a preferred embodiment, the first light sources 30 and the second light sources 40 are side-view LEDs, i.e. LEDs emit light from their sides. In this embodiment, the first substrate 10 and the second substrate 20 are respectively two ends of a folded long-strip flexible circuit board.

Figure 2B:
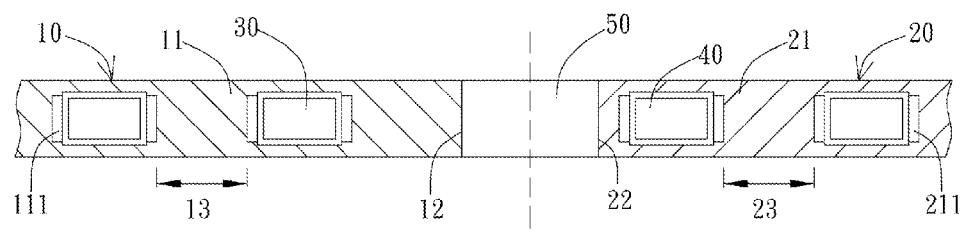
FIG. 2B is a schematic view of a second embodiment of a light source module of the present invention before folded.

FIG. 2B is a schematic view of a second embodiment of a light source module of the present invention before folded. As shown in FIG. 2B, the first substrate 10 and the second substrate 20 are two different circuit boards, wherein the substrates can be both flexible circuit boards or at least one of them is a rigid circuit board. The first substrate 10 and the second substrate 20 are disposed and extended in opposite directions to form a straight line. The first substrate 10 is a long-strip shape and has a first surface 11 and a first connecting portion 12, wherein the first connecting portion 12 is at one end of the first substrate 10 which corresponds to the second substrate 20. The first light sources 30 are disposed on the first surface 11 in a line along a direction away from the first connecting portion 12, i.e., disposed from one end near the first connecting portion 12 toward the other end, so that a first gap 13 is kept between the neighboring first light sources 30. The second substrate 20 is a long-strip shape and has a second surface 21 and a second connecting portion 22, wherein the second connecting portion 22 is at one end of the second substrate 20 which corresponds to the first substrate 10. The second light sources 40 are disposed on the second surface 21 in a line along a direction away from the second connecting portion 22, i.e., disposed from one end near the second connecting portion 22 toward the other end, so that a second gap 23 is kept between the neighboring second light sources 40. In a preferred embodiment, the length of the first gap 13 and that of the second gap 23 are substantially the same.

As shown in FIG. 2B, in this embodiment, the first connecting portion 11 and the second connecting portion 12 connect to each other through a foldable connecting interface 50. However, in other embodiments, the first connecting portion 12 can connect to the second connecting portion 22 directly. In a preferred embodiment, the foldable connecting interface 50 is a flexible circuit board. Moreover, the foldable connecting interface 50 preferably includes a connection circuit which electrically connects the first light source 30 and the second light source 40.

Figure 3A:
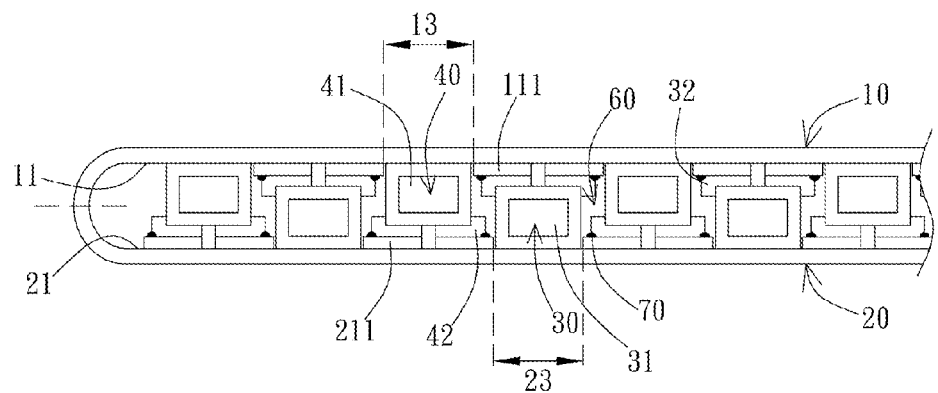
FIG. 3A is a schematic view of the embodiment of the light source module shown in FIG. 2A after folded.
Figure 3B:
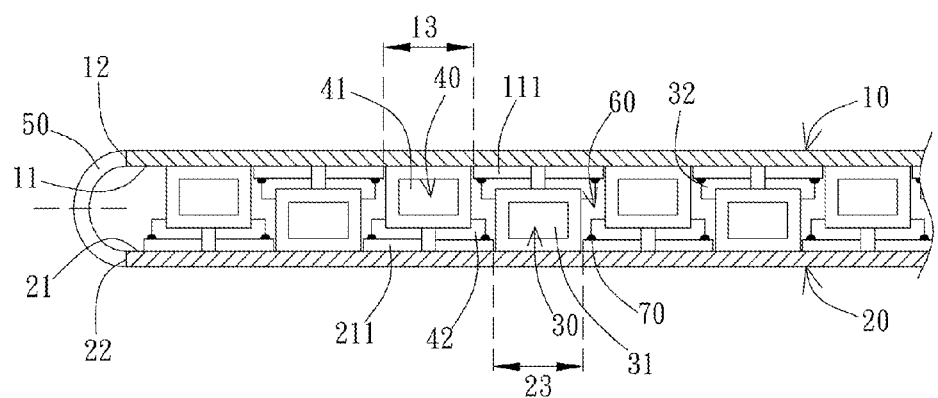
FIG. 3B is a schematic view of the embodiment of the light source module shown in FIG. 2B after folded.

FIG. 3A is a schematic view of the embodiment of the light source module shown in FIG. 2A after folded; FIG. 3B is a schematic view of the embodiment of the light source module shown in FIG. 2B after folded. As shown in FIG. 3A and FIG. 3B, the first substrate 10 and the second substrate 20 are disposed parallel to each other, so that the first surface 11 and the second surface 21 face each other. In the embodiments shown in FIG. 3A and FIG. 3B, at least a portion of the first light source 30 extends into the corresponding second gap 23 between the second light sources 40, and at least a portion of the second light source 40 extends into the corresponding first gap 13 between the first light sources 30, so that a gap 60 is kept between the adjacent first light source 30 and second light source 40, and the top of the first light source 30 and that of the second light source 40 are in contact with the second surface 21 and the first surface 11, respectively. However, in other embodiments, the adjacent first light sources 30 and second light sources 40 can be in contact with each other. Moreover, a gap can be kept between the top of the first light source 30 and the second surface 21 or between the top of the second light source 40 and the first surface 11.

Figure 3C:
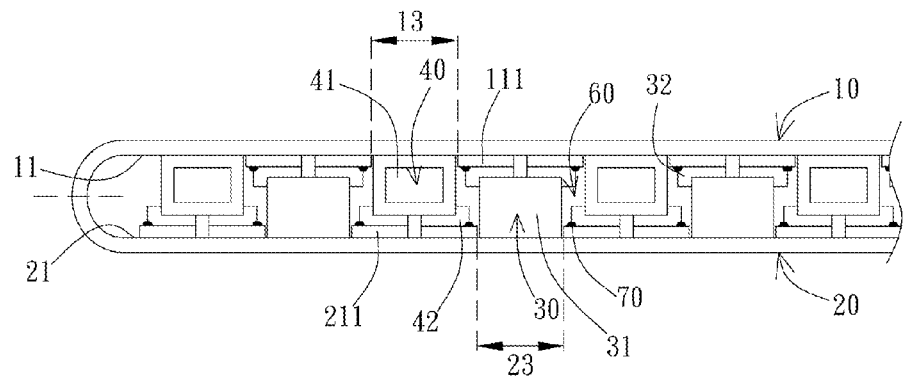
FIG. 3C is a schematic view of a third embodiment of a light source module of the present invention.

As shown in FIG. 3A and FIG. 3B, it is preferable to employ side-view LEDs as the first light sources 30 and the second light sources 40, so that the light source module emits lights from one side of the first substrate 10 and the second substrate 20. In a preferred embodiment, the first light source 30 and the second light source 40 have a first light emergent surface 31 and a second light emergent surface 41, respectively. The first light emergent surface 31 and the second light emergent surface 41 face a same direction, so that the lights are emitted from the first light source 30 and the second light source 40 toward a same direction. However, in other embodiments, as shown in FIG. 3C, the first light emergent surface 31 of the first light source 30 and the second light emergent surface 41 of the second light source 40 can face different directions. Moreover, the first light emergent surface 31 and the second light emergent surface 41 are preferably perpendicular to the first surface 11 and the second surface 21, respectively, so that the lights from the first light source 30 and the second light source 40 are emitted straightly from one side of the light source module.

As shown in FIG. 3A and FIG. 3B, first connecting pads 111 are disposed on the first surface 11. The first light emergent surface 31 is at the center of one side of the first light source 30. Soldering portions 32 are disposed on two sides of the bottom of the first light source 30, so that the two soldering portions 32 are respectively electrically connected to different first connecting pads 111, while the top of the first light source 30 is in contact with the second surface 21. Second connecting pads 211 are disposed on the second surface 21. The second light emergent surface 41 is at the center of one side of the second light source 40. Soldering portions 42 are disposed on two sides of the bottom of the second light source 40, so that the two soldering portions 42 are respectively electrically connected to different second connecting pads 211, while the top of the second light source 40 is in contact with the first surface 11. In this embodiment, the soldering portions 32 and the soldering portions 42 are electrically soldered to the first connecting pads 111 and the second connecting pads 211, respectively. Hence, solder joints 70 are formed between the soldering portions 32 and the first connecting pads 111 or between soldering portions 42 and the second connecting pads 211. A gap 60 is kept between the first light source 30 and the neighboring second light source 40, wherein the soldering portion 32 and the soldering portion 42 respectively protrude outside the first light source 30 and the second light source 40 to be accommodated in the gap 60.

Figure 4:
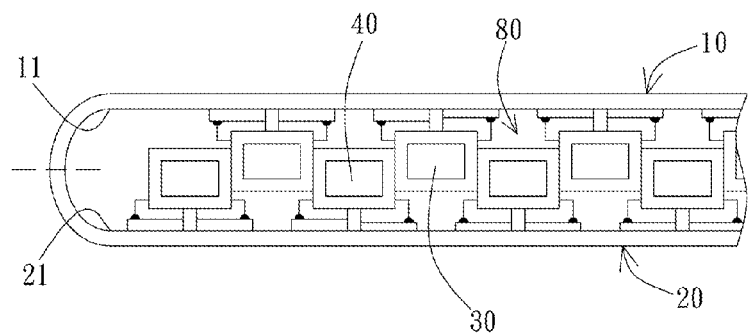
FIG. 4 is a schematic view of a fourth embodiment of a light source module of the present invention.

FIG. 4 is a schematic view of a fourth embodiment of a light source module of the present invention. As shown in FIG. 4, the adjacent first light sources 30 and second light sources 40 are in contact with each other. A gap 80 is respectively kept between the first light source 30 and the second surface 21 or between the second light source 40 and the first surface 11.

Figure 5:
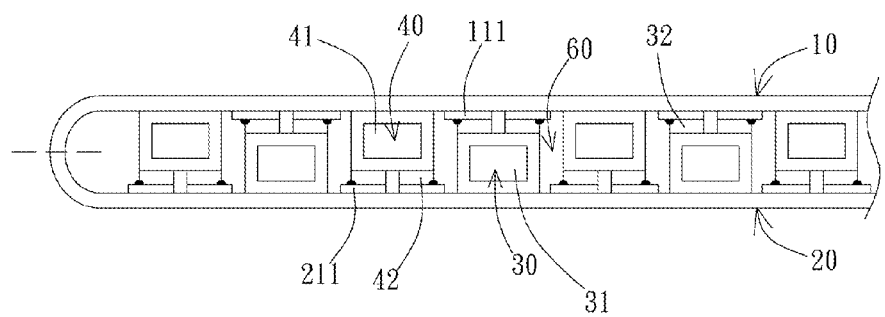
FIG. 5 is a schematic view of a fifth embodiment of a light source module of the present invention before folded.

In the embodiments shown in FIG. 3A, FIG. 3B, FIG. 3C, and FIG. 4, the soldering portions 32 and the soldering portions 42 protrude outside the edge of the bottom of the first light sources 30 and the second light sources 40, respectively, so that the soldering portions 32 and the soldering portions 42 are accommodated in the gap 60 and 80. However, in other embodiments, it is not necessary for the soldering portions 32 to protrude outside the edge of the bottom of the first light sources 30 and, similarly, it is not necessary for the soldering portions 42 to protrude outside the edge of the bottom of the second light sources 40. FIG. 5 is a schematic view of a fifth embodiment of a light source module of the present invention. As shown in FIG. 5, the soldering portions 32 are disposed under the bottom of the first light source 30 and between the first light source 30 and the first connecting pad 111 and, similarly, the soldering portions 42 are disposed under the bottom of the second light source 40 and between the second light source 40 and the second connecting pad 211.

Figure 6A:
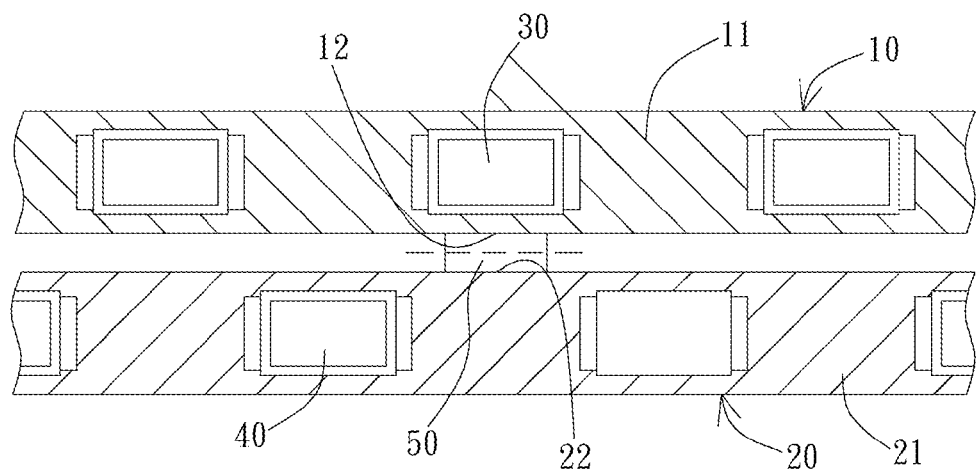
FIG. 6A is a schematic view of a sixth embodiment of a light source module of the present invention.

FIG. 6A is a schematic view of a sixth embodiment of a light source module of the present invention. As shown in FIG. 6A, the first substrate 10 and the second substrate 20 are disposed parallel to each other. The first connecting portion 12 is at one side of the first substrate 10 which corresponds to the second substrate 20. The first light sources 30 are disposed in a line on the first surface 11 along a direction parallel to the first connecting portion 12, i.e., from one end of the first substrate 10 toward the other end, so that the arranging direction of the first light sources 30 is parallel to the extending direction of the first connecting portion 12. Correspondingly, the second connecting portion 22 is at one side of the second substrate 20 which corresponds to the first substrate 10. The second light sources 40 are disposed in a line on the second surface 21 along a direction parallel to the second connecting portion 22, i.e., from one end of the second substrate 20 toward the other end, so that the arranging direction of the second light sources 40 is parallel to the extending direction of the second connecting portion 22.

Figure 6B:
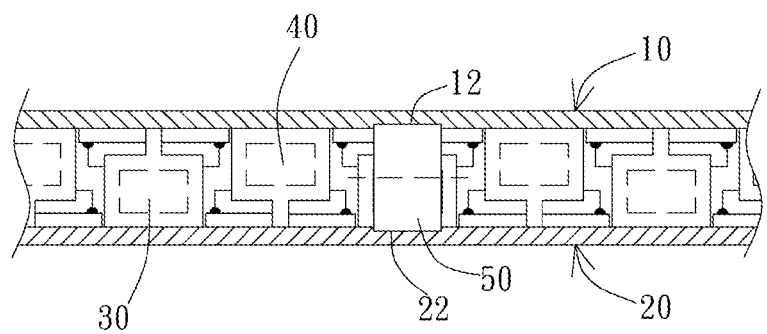
FIG. 6B is a schematic view of the embodiment of the light source module shown in FIG. 6A after folded.

FIG. 6B is a schematic view of the embodiment of the light source module shown in FIG. 6A after folded. As shown in FIG. 6B, the first substrate 10 and the second substrate 20 are disposed parallel to each other, so that the first surface 11 and the second surface 21 face each other, and the first light sources 30 and the second light sources 40 interlace with each other. In this embodiment, the first connecting portion 11 and the second connecting portion 12 are connected to each other through a foldable connecting interface 50. However, in other embodiments, the first connecting portion 12 can connect to the second connecting portion 22 directly.

As shown in the above-mentioned embodiments, the light source module of the present invention increases the density of light sources by interlacing the first light sources 30 and the second light sources 40, so that more light sources can be accommodated to meet severe brightness requirement while the length of effective display region of a flat panel display is fixed.

Figure 7A:
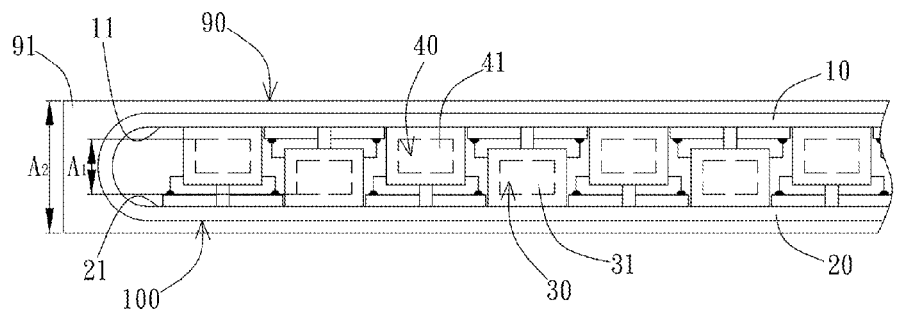
FIG. 7A is a schematic view of a backlight module with the light source module shown in FIG. 3A.

FIG. 7A is a schematic view of a backlight module with the light source module shown in FIG. 3A. As shown in FIG. 7A, the backlight module includes a light guide plate 90 and a light source module 100. The light guide plate 90 has a light incident surface 91. Lights enter the light guide plate 90 from its side surface (light incident surface 91). The light source module 100 is disposed opposite to the light incident surface 91, wherein the light source module 100 includes a first substrate 10, a second substrate 20, first light sources 30, and second light sources 40. The first substrate 10 and the second substrate 20 are disposed parallel to each other, so that the first light sources 30 on the first surface 11 are interlaced with the second light sources 40 on the second surface 21.

Figure 7B:
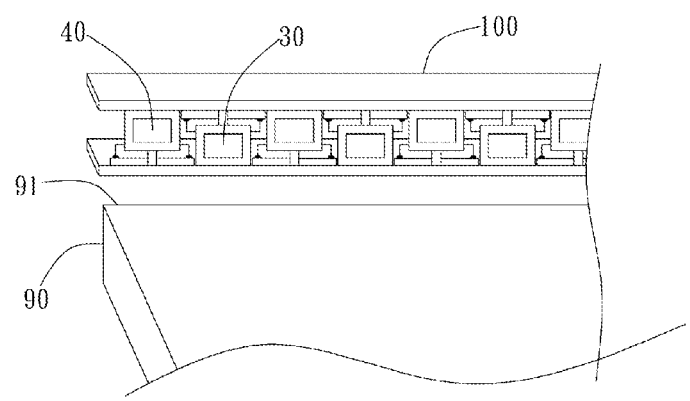
FIG. 7B is a schematic view of the backlight module shown in FIG. 7A from another angle.

As shown in FIG. 7A, the first light sources 30 and the second light sources 40 are disposed along the light incident surface 91. FIG. 7B is a schematic view of the backlight module shown in FIG. 7A from another angle. As shown in FIG. 7B, the light emergent surfaces of the first light sources 30 and the second light sources 40 face the light incident surface 91, so that the lights from the first light sources 30 and the second light sources 40 enter the light guide plate 90 from this side surface. In a preferred embodiment, the light emergent surfaces of the first light sources 30 and the second light sources 40 are perpendicular to the first surface 11 and the second surface 21, respectively, so that the lights from the first light sources 30 and the second light sources 40 are emitted straightly from one side of the light source module. Moreover, the projection of the first light emergent surface 31 of the first light source 30 and that of the second light emergent surface 41 of the second light source 40 on a plane where the light incident surface 91 is located are within the coverage of the light incident surface 91. For instance, the distance $A_1$ between the edge of the first light emergent surface 31 near the second surface 21 and the edge of the second light emergent surface 41 near the first surface 11 is not larger than the thickness $A_2$ of the light guide plate 90, so that the lights from the first light sources 30 and second light sources 40 can be fully utilized by the light guide plate 90 to reduce the waste of light energy. However, the locations of the light emergent surfaces of the light sources corresponding to the light incident surface 91 of the light guide plate 90 can be adjusted according to different design needs.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A light source module, comprising:
a first substrate having a first surface and a first connecting portion;
a plurality of first light sources arranged in a line and disposed on the first surface, wherein a first gap is kept between the neighboring first light sources;
a second substrate having a second surface and a second connecting portion connected to the first connecting portion, wherein the second substrate is disposed parallel to the first substrate, and the second surface faces the first surface; and
a plurality of second light sources arranged in a line and disposed on the second surface, wherein a second gap is kept between the neighboring second light sources;
wherein at least a portion of the first light source extends into the corresponding second gap and at least a portion of the second light source extends into the corresponding first gap, the first surface has a plurality of first connecting pads, each of the first light sources has at least a soldering portion, the first light source is electrically connected to the first connecting pad through the soldering portion, a gap is kept between the first light source and the neighboring second light source, the soldering portion protrudes outside the first light source to be accommodated in the gap.

2. The light source module of claim 1, wherein the first light source and the second light source have a first light emergent surface and a second light emergent surface, respectively, and the first light emergent surface and the second light emergent surface face a same direction.

3. The light source module of claim 2, wherein the first light emergent surface and the second light emergent surface are perpendicular to the first surface and the second surface, respectively.

4. The light source module of claim 1, wherein the first substrate and the second substrate are two ends of a folded flexible circuit board.

5. The light source module of claim 1, wherein at least one of the first substrate and the second substrate is a rigid circuit board.

6. The light source module of claim 1, further comprising a foldable connecting interface connected to the first connecting portion of the first substrate and the second connecting portion of the second substrate, respectively.

7. The light source module of claim 6, wherein the foldable connecting interface includes a flexible circuit board.

8. The light source module of claim 6, wherein the foldable connecting interface includes a connection circuit electrically connected to the first light sources and the second light sources.

9. The light source module of claim 1, wherein the first light sources are disposed along a direction away from the first connecting portion, the second light sources are disposed along a direction away from the second connecting portion.

10. The light source module of claim 1, wherein the first light sources are disposed along an extending direction of the first connecting portion, the second light sources are disposed along the extending direction of the second connecting portion.

11. A light source module, comprising:
a first substrate having a first surface and a first connecting portion;
a plurality of first light sources arranged in a line and disposed on the first surface, wherein a first gap is kept between the neighboring first light sources;
a second substrate having a second surface and a second connecting portion connected to the first connecting portion, wherein the second substrate is disposed parallel to the first substrate, and the second surface faces the first surface; and
a plurality of second light sources arranged in a line and disposed on the second surface, wherein a second gap is kept between the neighboring second light sources;
wherein at least a portion of the first light source extends into the corresponding second gap and at least a portion of the second light source extends into the corresponding first gap, wherein the first surface has a plurality of first connecting pads, each of the first light source has at least a soldering portion, the first light source is electrically connected to the first connecting pad through the soldering portion, a gap is kept between the second light source and the first surface, the soldering portion protrudes outside the first light source to be accommodated in the gap.

12. A light source module, comprising:
a first substrate having a first surface and a first connecting portion;
a plurality of first light sources arranged in a line and disposed on the first surface, wherein a first gap is kept between the neighboring first light sources;
a second substrate having a second surface and a second connecting portion connected to the first connecting portion, wherein the second substrate is disposed parallel to the first substrate, and the second surface faces the first surface; and
a plurality of second light sources arranged in a line and disposed on the second surface, wherein a second gap is kept between the neighboring second light sources;
wherein at least a portion of the first light source extends into the corresponding second gap and at least a portion of the second light source extends into the corresponding first gap, wherein the first surface has a plurality of first connecting pads, each of the first light source has at least a soldering portion, the first light source is electrically connected to the first connecting pad through the soldering portion, the soldering portion is disposed under the first light source and between the first light source and the first connecting pad.

13. A backlight module, comprising:
a light source module, including:
a first substrate having a first surface and a first connecting portion;
a plurality of first light sources arranged in a line and disposed on the first surface, wherein a first gap is kept between the neighboring first light sources;
a second substrate having a second surface and a second connecting portion connected to the first connecting portion, wherein the second substrate is disposed parallel to the first substrate, and the second surface faces the first surface; and
a plurality of second light sources arranged in a line and disposed on the second surface, wherein a second gap is kept between the neighboring second light sources;
wherein at least a portion of the first light source extends into the corresponding second gap and at least a portion of the second light source extends into the corresponding first gap; and
a light guide plate having a light incident surface, wherein the first light sources and the second light sources are interlaced and disposed along the light incident surface;
wherein the first surface has a plurality of first connecting pads, each of the first light source has at least a soldering portion, the first light source is electrically connected to the first connecting pad through the soldering portion, a gap is kept between the first light source and the neighboring second light source, the soldering portion protrudes outside the first light source to be accommodated in the gap.

14. The backlight module of claim 13, wherein the first light source and the second light source have a first light emergent surface and a second light emergent surface, respectively, and the first light emergent surface and the second light emergent surface both face the light incident surface.

15. The backlight module of claim 14, wherein projections of the first light emergent surface and the second light emergent surface on a plane where the light incident surface is located are within the coverage of the light incident surface.

16. The backlight module of claim 14, wherein the first light emergent surface and the second light emergent surface are perpendicular to the first surface and the second surface, respectively.

17. The backlight module of claim 13, wherein the first substrate and the second substrate are two ends of a folded flexible circuit board.

18. The backlight module of claim 13, wherein at least one of the first substrate and the second substrate is a rigid circuit board.

19. The backlight module of claim 13, further comprising a foldable connecting interface connected to the first connecting portion of the first substrate and the second connecting portion of the second substrate, respectively.

20. The backlight module of claim 19, wherein the foldable connecting interface includes a flexible circuit board.

21. The backlight module of claim 19, wherein the foldable connecting interface includes a connection circuit electrically connected to the first light sources and the second light sources.

22. The backlight module of claim 13, wherein the first light sources are disposed along a direction away from the first connecting portion, the second light sources are disposed along a direction away from the second connecting portion.

23. The backlight module of claim 13, wherein the first light sources are disposed along an extending direction of the first connecting portion, the second light sources are disposed along the extending direction of the second connecting portion.

* * * * *